Jan. 5, 1932.   G. F. RAYMOND   1,839,439
MEASURING DEVICE.
Filed April 10, 1929
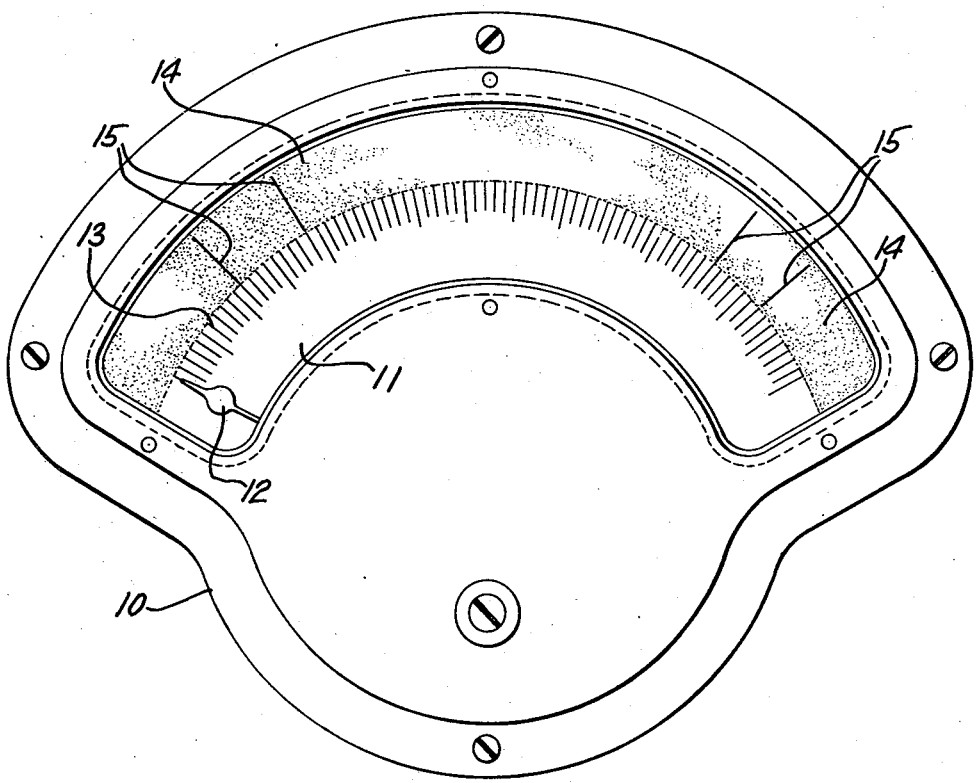
Inventor
Gussie F. Raymond
By   Att'y.

Patented Jan. 5, 1932

1,839,439

UNITED STATES PATENT OFFICE

GUSSIE FRANKLIN RAYMOND, OF CICERO, ILLINOIS, ASSIGNOR TO WESTERN ELECTRIC COMPANY, INCORPORATED, OF NEW YORK, N. Y., A CORPORATION OF NEW YORK

MEASURING DEVICE

Application filed April 10, 1929. Serial No. 354,161.

This invention relates to measuring devices and more particularly to measuring devices having means for receiving erasable indicia for denoting tolerance limits.

In some cases measuring devices or instruments employ a normally stationary, adjustable indicator cooperating with a movable pointer for denoting manufacturing tolerance limits of the measured characteristics of particular types of articles. The adjustable indicator has not been found satisfactory in all cases, due to its high initial and maintenance costs, and in addition it is not practical in some instances where it is desirable to use a plurality of indicia on the device at the same time for denoting a plurality of tolerance limits, since the operator is very likely to be confused in reading the instrument.

The primary object of this invention is to provide a simple and efficient measuring device provided with means upon which indicia may be economically applied, maintained and changed in accordance with the particular requirements.

In accordance with one embodiment of this invention as applied to a usual type of electrical measuring instrument, the transparent glass window which visibly exposses the scale and the movable indicating pointer is treated chemically or mechanically upon a portion of its outer surface to provide a frosted or roughened surface following the outer edge of a calibrated scale and the path of the pointer. The treated surface of the glass window is such that readily erasable indicia, such as pencil marks, may be quickly applied as desired to denote tolerance limits of the measured characteristics of particular type of articles.

Other objects and advantages of this invention will more fully appear from the following detailed description taken in connection with the accompanying drawing.

The single figure of the accompanying drawing is an elevational view of an electrical meter or measuring instrument embodying the features of this invention.

Referring now to the drawing in detail, which illustrates the invention applied to a usual type of electrical meter, a meter casing or housing 10 is provided with a plane arc-shaped glass window 11 which exposes the outer end of a pivotal indicating pointer 12 and a scale 13 across which the pointer moves. The scale 13 is supported in a usual manner in the casing 10 and in spaced relation with the inner surface of the glass window 11 and follows the arc through which the pointer 12 moves between the opposed surfaces of the window and the scale. The window 11, in the particular instrument to which the invention is applied, extends outside of the outer edge of the scale 13, which portion is indicated by the numeral 14, for a distance substantially equal to the portion of the glass window directly over the scale and follows the outer edge thereof. That portion of the glass window 11 which is over the scale 13 is transparent, while the contiguous portion 14 thereof outside of the scale 13 is provided with a frosted or roughened outer surface, which may be accomplished by any suitable means; for instance, by a chemical treatment, or preferably by a light sand blasting treatment. Applied to the frosted portion 14 of the window 11 by a soft pencil or other suitable marking means are indicia 15. Due to the nature of the surface 14 the pencil marks forming the indicia 15 are readily received thereby and may be easily removed therefrom by applying an ordinary rubber eraser or other effacing means.

The indicia 15 are applied to the surface 14 for the purpose of denoting tolerance limits of the characteristics to be measured or tested of particular types of articles. By means of the indicia 15 in cooperation with the calibrated scale 13 an operator may readily determine when the particular characteristic of the article being tested is within certain tolerance limits. For example, when the pointer 12 in a testing operation wavers or holds steady between the indicia 15 at the left side of the scale 13, which indicia are predeterminedly marked on the surface 14 for a particular article to be tested, the measured characteristic of the article is within the predetermined tolerance limits. In case the pointer 12 does not reach a point between the indicia 15, or in case it moves past the indicia, the characteristic being measured falls short of or exceeds, respectively, the predetermined requirement and the article is rejected. When testing or measuring characteristics differing in a plurality of elements of a single type of article, or differing in several types of articles, additional indicia 15 may be marked on the surface 14 of the window 11. In the drawing another indicium 15 is marked on the surface 14 at the right side of the scale 13, and it will be apparent that different indicia 15 may be used on the instrument at the same time without tending to confuse the operator.

When it is desired to vary the tolerance limits provided by the indicia 15 upon the surface 14 of the window 11 an ordinary rubber eraser may be applied thereto and the indicia readily effaced and another indicia marked thereon by a pencil or other similar marker.

Although in the particular instrument shown in the drawing the frosted or roughened surface 14 for receiving the indicia 15 is formed on a portion of the glass window 11, it will be apparent that it may be formed on an independent piece of glass positioned adjacent to the scale 13 and the pointer 12, or upon the surface of a member of a different character; namely, a cellulose product of a suitable color so that the indicia 15 marked thereon will be clearly visible to the eye.

It will be apparent from the foregoing description that a measuring device embodying the features of the present invention is provided with indicia cooperating with the movable pointer and calibrated scale of the device for denoting tolerance limits of the characteristics to be measured of particular articles, which indicia may be readily and economically applied, maintained and changed in accordance with the particular requirements.

Although the invention has been disclosed and described in connection with a particular type of measuring instrument, it will be understood that the invention is capable of application to other types of measuring instruments, for instance, to dimension measuring instruments or devices, and is only limited by the scope of the appended claims.

What is claimed is:

1. In a measuring instrument, a scale, a pointer movable with respect to the scale, a member having a transparent portion through which the scale and the pointer are visible with another portion thereof having a surface coextensive with the scale for receiving erasable indicia cooperating with the pointer and the scale for denoting tolerance limits of a measured characteristic of an article.

2. In a measuring instrument, a scale, a pointer movable with respect to the scale, a casing enclosing the scale and the pointer, and a transparent window in the casing for visibly exposing the scale and the pointer and having a portion of its surface coextensive with the scale treated for receiving erasable indicia cooperating with the pointer and the scale for denoting tolerance limits of a measured characteristic of an article.

3. In a measuring instrument, a scale, a pointer movable with respect to the scale, a casing enclosing the scale and the pointer, and a glass window in the casing for visibly exposing the scale and the pointer with a portion of its outer surface coextensive with the scale roughened for receiving erasable indicia cooperating with the pointer and the scale for denoting tolerance limits of a measured characteristic of an article.

4. In a measuring instrument, a scale, a pointer movable with respect to the scale, a casing enclosing the scale and the pointer, and a glass window in the casing for visibly exposing the scale and the pointer with a contiguous portion of its outer surface coextensive with the scale and treated to provide a frosted translucent surface for receiving erasable pencil marked indicia cooperating with the pointer and the scale for denoting tolerance limits of a measured characteristic of an article.

In witness whereof, I hereunto subscribe my name this 30th day of March, A. D. 1929.

GUSSIE FRANKLIN RAYMOND.